(No Model.)
F. N. DU BOIS.
PLUMBER'S TRAP.
No. 287,510. Patented Oct. 30, 1883.
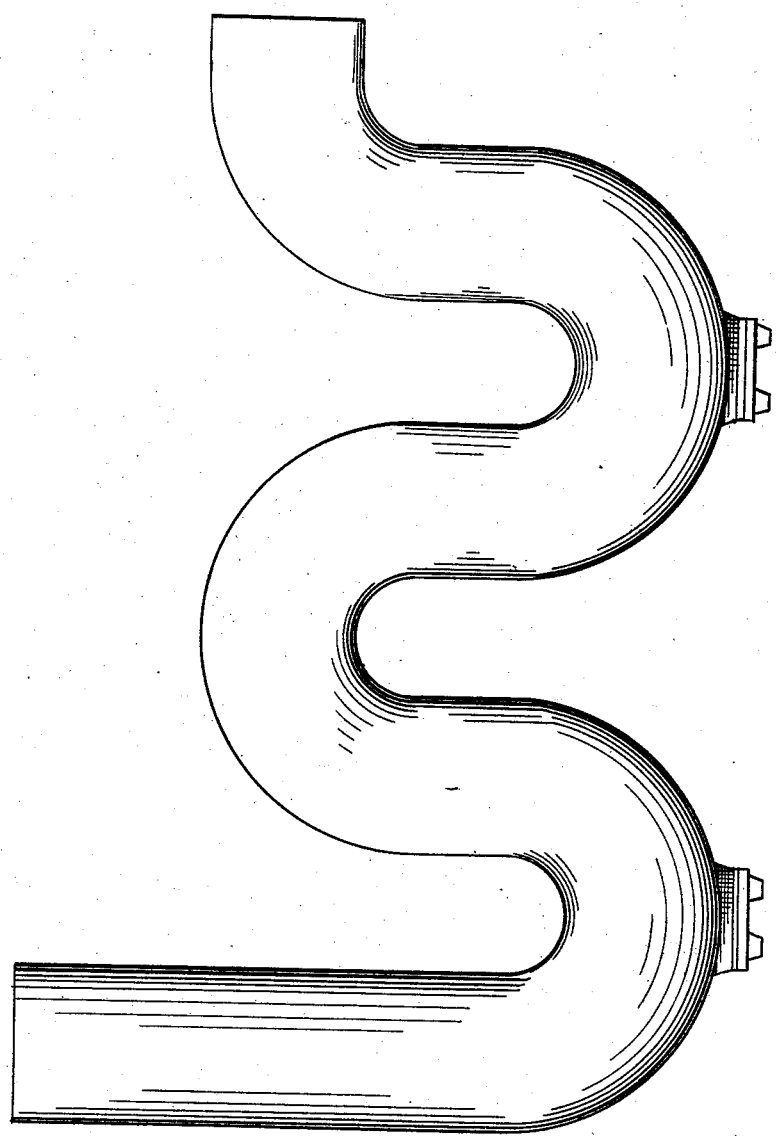

UNITED STATES PATENT OFFICE.

FREDERICK N. DU BOIS, OF NEW YORK, N. Y.

PLUMBER'S TRAP.

SPECIFICATION forming part of Letters Patent No. 287,510, dated October 30, 1883.

Application filed April 6, 1882. (No model.)

*To all whom it may concern:*

Be it known that I, FREDERICK N. DU BOIS, of New York, in the county and State of New York, have invented a new and useful Improvement in Plumbers' Soft-Metal Traps, of which the following is a specification.

My invention relates to that class of traps of wrought soft metal which are known in the trade as "plumbers' traps," and which are made of lead and curved, so as to retain a body of water in a U-formed bend or seal, which opposes resistance to the upward passage of gases.

My improvement consists in making such a trap in a single piece, with a series of two or more seals, which, containing more water, will afford a better protection to the user than is attainable by the use of a single-seal trap.

I am aware that two sewer-traps have been placed end to end, for the purpose of insuring the escape of gases through an escape-pipe placed at or near their junction; but my invention is distinguished therefrom in this, that the trap is made in one piece, with two or more seals, by forcing the metal through a die in the same manner that my die-drawn seamless traps, which are now well known, are made. I am enabled to make these traps with a series of seals by means of the machinery and process employed and described in Letters Patent No. 167,076, issued to me on the 24th day of August, 1875.

The metal, in a melted state, having been poured into the press, is, when cooled and solidified, expelled before two plungers operating in opposite ends of one cylinder, and independently actuated by hydraulic presses, so that they may be moved at different speeds. By accelerating the movement of one plunger, the metal tube emerging from the nozzle or die will be made to curve toward the other. By making them move at the same speed, the pipe will issue straight from the die. By reversing the relative speeds of the plungers, the issuing pipe will be made to curve toward the slower-moving one, and thus a succession of reversed curves with intermediate straight sections may be made.

In the annexed drawing I have shown a trap with two seals; but the number may be increased, and the greater the number the longer the trap will contain water when not in use, and so defer the opening of the same for the passage of sewer-gases by the evaporation of the water. A screw-plug is placed at the bottom of each seal, for the purpose of drawing off the water and cleaning the trap.

I disclaim, broadly, a trap with two seals or bends, for I am aware that such traps have been proposed for the outside connection with the sewer in prior patents. My invention is, however, distinguished from such traps in this, that they were to be built either of brick-work or by other means, or made up by laying two common single-seal traps end to end, and having at the middle upward bend an opening for the escape of gas through a vent-pipe, while my invention is limited to traps drawn in a single piece, from soft metal, with two or more seals, such traps being of the kind commonly known as "plumbers' traps," and adapted for use in the interior pipes of buildings, and sold entire as an article of manufacture.

What I claim as my invention, and desire to secure by Letters Patent, is—

A plumber's trap of seamless soft metal constructed with a series of seals or dips, substantially as set forth.

In testimony whereof I affix my signature in presence of two witnesses.

FREDERICK N. DU BOIS.

Witnesses:
 PETER VAN ANTWERP,
 THOMAS VAN ANTWERP.